(12) United States Patent
Buser et al.

(10) Patent No.: US 8,883,007 B2
(45) Date of Patent: Nov. 11, 2014

(54) FLUID SEPARATION SYSTEM WITH REDUCED FOULING

(75) Inventors: Mark F. Buser, Jupiter, FL (US); Alan B. Minick, Madison, AL (US)

(73) Assignee: Aerojet Rocketdyne of DE, Inc., Canoga Park, CA (US)

( * ) Notice: Subject to any disclaimer, the term of this patent is extended or adjusted under 35 U.S.C. 154(b) by 676 days.

(21) Appl. No.: 13/203,027

(22) PCT Filed: Dec. 13, 2009

(86) PCT No.: PCT/US2009/067800
§ 371 (c)(1),
(2), (4) Date: Aug. 24, 2011

(87) PCT Pub. No.: WO2010/098803
PCT Pub. Date: Sep. 2, 2010

(65) Prior Publication Data
US 2012/0018366 A1    Jan. 26, 2012

Related U.S. Application Data

(60) Provisional application No. 61/208,523, filed on Feb. 25, 2009.

(51) Int. Cl.
*B01D 63/06* (2006.01)
*B01D 63/10* (2006.01)
*B01D 69/02* (2006.01)
*B01D 65/08* (2006.01)
*C02F 1/44* (2006.01)

(52) U.S. Cl.
CPC ............... *B01D 69/02* (2013.01); *B01D 63/10* (2013.01); *B01D 65/08* (2013.01); *B01D 2313/08* (2013.01); *B01D 2321/2016* (2013.01); *B01D 2325/08* (2013.01)
USPC .................. 210/321.74; 210/321.83; 210/483

(58) Field of Classification Search
CPC .. B01D 63/10; B01D 63/103; B01D 2313/08; B01D 2313/086; B01D 2325/08
See application file for complete search history.

(56) References Cited

U.S. PATENT DOCUMENTS

| | | |
|---|---|---|
| 188,224 A | 3/1877 | Allen |
| 1,029,583 A | 6/1912 | Bennett |
| 4,016,082 A | 4/1977 | Riede et al. |
| 4,296,951 A | 10/1981 | Zimmerly |
| 4,301,013 A | 11/1981 | Setti et al. |
| 4,517,085 A | 5/1985 | Driscoll et al. |
| 4,834,881 A | 5/1989 | Sawada et al. |

(Continued)

FOREIGN PATENT DOCUMENTS

| | | |
|---|---|---|
| CA | 1214114 | 11/1986 |
| JP | 2010125418 | 6/2010 |

(Continued)

OTHER PUBLICATIONS

Search Report and Written Opinion mailed on Mar. 1, 2010 for PCT/US2009/067800.

(Continued)

*Primary Examiner* — Benjamin Kurtz
(74) *Attorney, Agent, or Firm* — Joel G Landau

(57) ABSTRACT

A fluid separation system includes a separation membrane having a pattern of features thereon.

1 Claim, 23 Drawing Sheets

(56) References Cited

U.S. PATENT DOCUMENTS

| | | |
|---|---|---|
| 4,855,058 A | 8/1989 | Holland et al. |
| 5,094,749 A * | 3/1992 | Seita et al. ............... 210/321.75 |
| 5,985,146 A | 11/1999 | Knappe et al. |
| 6,224,767 B1 | 5/2001 | Fujiwara et al. |
| 6,632,357 B1 | 10/2003 | Barger et al. |
| 6,805,730 B2 | 10/2004 | Herczeg |
| 6,881,336 B2 | 4/2005 | Johnson |
| 6,902,672 B2 | 6/2005 | Herron |
| 6,908,547 B2 | 6/2005 | Cote et al. |
| 6,984,321 B2 | 1/2006 | Heine |
| 7,008,465 B2 | 3/2006 | Graham et al. |
| 7,090,784 B2 | 8/2006 | Asakawa et al. |
| 7,097,781 B2 | 8/2006 | Asakawa et al. |
| 7,270,744 B2 | 9/2007 | Petersen et al. |
| 7,303,675 B2 | 12/2007 | De La Cruz |
| 7,306,709 B2 | 12/2007 | Grebenyuk et al. |
| 7,311,831 B2 | 12/2007 | Bradford et al. |
| 7,318,898 B2 | 1/2008 | Sabottke |
| 7,338,601 B2 | 3/2008 | Schott et al. |
| 8,292,492 B2 * | 10/2012 | Ho et al. .................. 366/341 |
| 2004/0011723 A1 | 1/2004 | Bradford et al. |
| 2007/0095756 A1 | 5/2007 | Hardwicke et al. |

FOREIGN PATENT DOCUMENTS

| | | |
|---|---|---|
| WO | WO96/33798 | 10/1996 |
| WO | WO97/06693 | 2/1997 |
| WO | 0220142 | 3/2002 |
| WO | WO02/051529 | 7/2002 |

OTHER PUBLICATIONS

Japanese Office Action for Japanese Patent Application No. 2011-552018 dated Feb. 5, 2013.

International Application No. PCT/US2009/67800 Notification Concerning Transmittal of International Preliminary Report on Patentability, (2012).

* cited by examiner

FLUID SEPARATION SYSTEM WITH REDUCED FOULING

The present disclosure claims priority to U.S. Provisional Patent Application No. 61/208,523, filed Feb. 25, 2009.

BACKGROUND

The present application relates to a fluid separation system, and more particularly to a separation membrane therefor.

Conventional Reverse Osmosis fluid separation systems have multiple layers of membranes, feed channel spacers, and permeate collection materials interleafed to provide concentrate and permeate flow passages. The feed channel spacers are typically separate screen type members that increase fluid flow turbulence. The feed channel spacers may be prone to sediment collection and fouling.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1A:
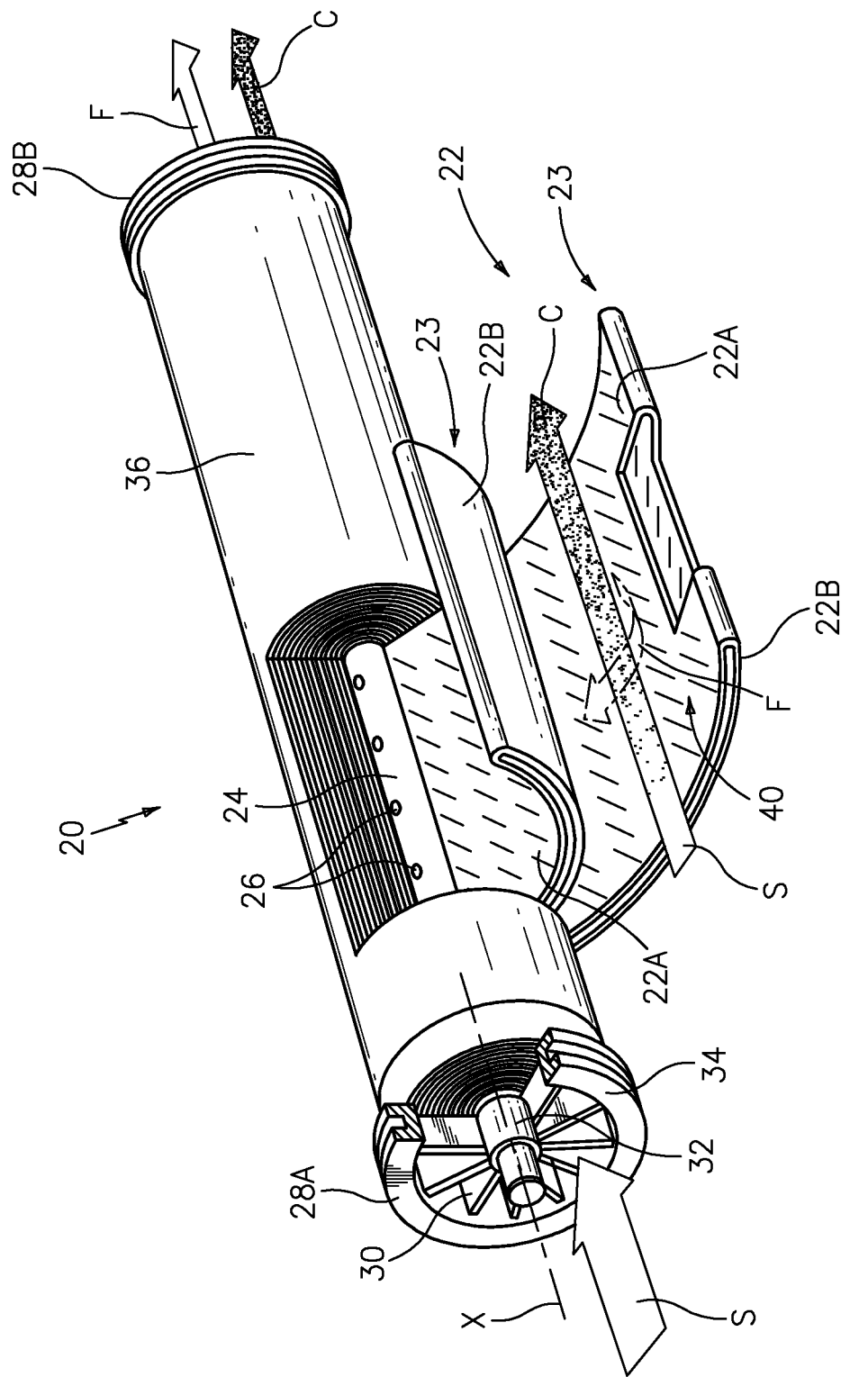
FIG. 1A is a general schematic partial sectional view of a fluid separation system.
Figure 1B:
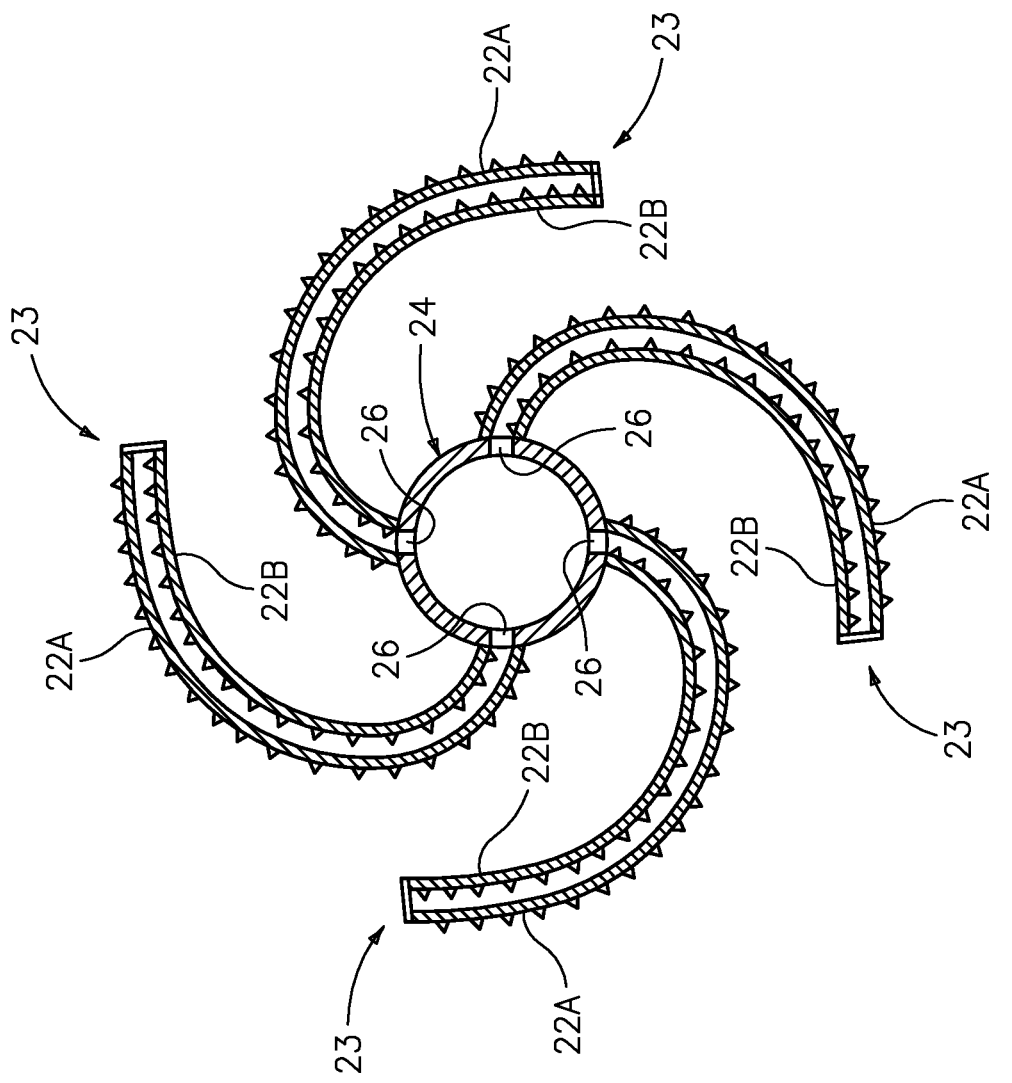
FIG. 1B is an end view of the fluid separation system in a partially unwound view.

FIG. 1A schematically illustrates a fluid separation system 20. The fluid separation system 20 generally includes a plurality of separation membranes 22 which are spiral wound about a permeate collection tube 24 (FIG. 1B). The permeate collection tube 24 is defined along an axis X and defines a multiple of apertures 26 distributed in sets along a length of the permeate collection tube 24.

An anti-telescoping plate 28A, 28B is attached to the permeate collection tube 24 to retain the plurality of separation membranes 22 therebetween and prevent telescoping of the plurality of separation membranes 22 in response to fluid flow. Each anti-telescoping plate 28A, 28B includes an annular flow path 30 defined between a permeate collection tube support 32 and a rim 34. The anti-telescoping plate 28A, 28B may be attached to a pressure vessel 36 at the rim 34 thereof to contain the plurality of separation membranes 22 therein. The fluid separation system 20 may be formed as a cylindrical module such that a multiple may be connected in series. Other cross-sectional shapes may alternatively be provided.

Reverse osmosis (RO) is a separation process that uses pressure to force a solution through a membrane that retains the solute on one side and allows the pure solvent to pass to the other side. More formally, the process of forcing a solvent from a region of high solute concentration through a membrane to a region of low solute concentration is achieved through application of a pressure in excess of the osmotic pressure. As used herein, the term "separation membrane" refers to any material used for reverse osmosis such as a dense barrier layer in a polymer matrix where most separation occurs. Although the separation membranes 22 disclosed herein allow only water to pass through this dense layer while preventing the passage of solutes such as salt ions, any material to which a reverse osmosis type process may be applied will also benefit herefrom.

The plurality of separation membranes 22 are arranged in pairs of separation membranes 22A, 22B to define a fluid separation element or "leaf" 23 which is closed on three sides. As used herein, the term "leaf" refers to a separation membrane arrangement which is in communication with a set of apertures 26 such that a solution through the separation membrane retains the solute on one side and allows the pure solvent to pass to the other side for communication into the set of apertures 26. The fourth or open side of each leaf 23 is located adjacent a respective set of apertures 26 in the permeate collection tube 24 to define a fluid flow path from between each pair of separation membranes 22A, 22B into the permeate collection tube 24 (FIG. 1B; here illustrated schematically as having four leafs 23A-23D). A set of apertures as defined herein may be considered but one row of the multiple of apertures as best seen in FIG. 1B. It should be understood that although a single leaf 23 with the pair of separation membranes 22A, 22B and the single set of apertures 26 are described in detail herein, each leaf 23 within the plurality of separation membranes 22 is arranged and operates in a generally comparable manner.

A pattern of features 40 (illustrated schematically) are formed on each, or on particular combinations of, the plurality of separation membranes 22. The features 40 may be of various sizes and shapes including, but not limited to, waves, arcs, lines, chevrons, and such like. As used herein, the term "feature" refers to any protrusion, bump, knob, jut, projection, protuberance, ridge, line, etc. that is formed on the separation membrane 22. The features 40 may be formed in one non-limiting embodiment by screen printing of an elastomeric material onto one or both sides of each or particular combinations of the plurality of separation membranes 22 to form the pattern. It should be understood that the pattern of features 40 may be otherwise provided such as through integral formation within the separation membranes 22. The elastomeric material may additionally be utilized to seal the three sides of the pair of separation membranes 22A, 22B. Although an elastomeric material is disclosed herein, it should be understood that various polymer and other materials may alternatively or additionally be utilized to form the features 40.

The pattern of features 40 are oriented and arranged, for example, to enhance turbulence, reduce back pressure and reduced sediment trapping such as bio-fouling or other solidified solute.

The pattern of features 40 may be tailored specifically to the different requirements for different sections of the plurality of separation membranes 22 such as for high flow, low pressure loss at an inlet adjacent the anti-telescoping plate 28A and a lower flow, higher pressure loss at an exit adjacent the anti-telescoping plate 28B.

The pattern of features 40 may also operate as a spacer between the plurality of separation membranes 22 such that the fluid flow is tailored specifically to the membrane requirements, including, but not limited to, flux, turbulence, disruption of the boundary layer, etc. It should be understood that various computerized fluid flow model systems may be utilized to determine the desired pattern of features 40.

A feed solution S supplied through the anti-telescoping plate 28A enters between the leafs 23. While the feed solution S flows over and around the leafs 23, permeate fluid F, for example water, permeates through the pairs of separation membranes 22A, 22B into each leaf 23 while concentrate C continues between the leafs 23.

The permeated fluid F flows between the pairs of separation membranes 22A, 22B within the leaf toward the permeate collection tube 24 where the permeate fluid F is collected therein through the set of apertures 26. Permeated flow F within the permeate collection tube 24 flows therein in a downstream direction. Concentrate C which does not permeate through the pairs of separation membranes 22A, 22B into each leaf 23 exits downstream through the annular exit of the anti-telescoping plate 28B.

The pattern of features 40 are applied directly to the plurality of separation membranes 22 in various combinations, for example, to eliminate separate feed channel spacer layers and permeate collection material layers while sediment trapping is minimized or eliminated. This allows flexibility in the design of the flow pattern relative to the fluid flow path.

Figure 2:
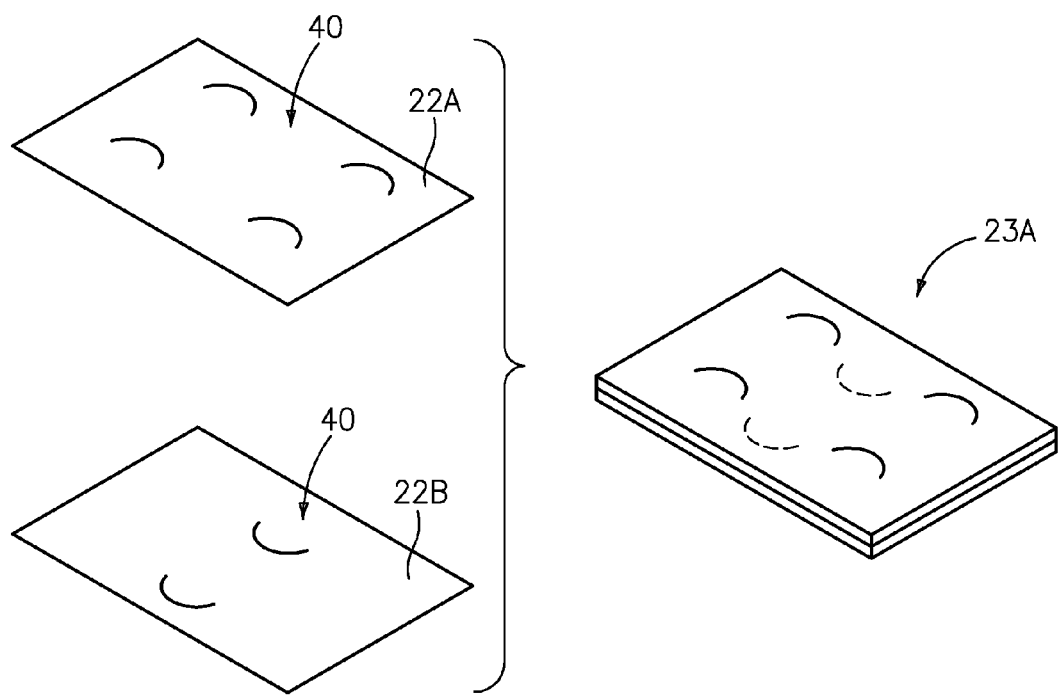
FIG. 2 is one non-limiting embodiment of a pattern of features applied to a pair of separation membranes.

Referring to FIG. 2, each leaf 23A may include a pattern of features 40 applied to one side of each of the pair of separation membranes 22A, 22B. The pattern of features 40 may operate to space the pair of separation membranes 22A, 22B from each other within the leaf 23A as well as separate each leaf 23 within the plurality of separation membranes 22.

Figure 3:
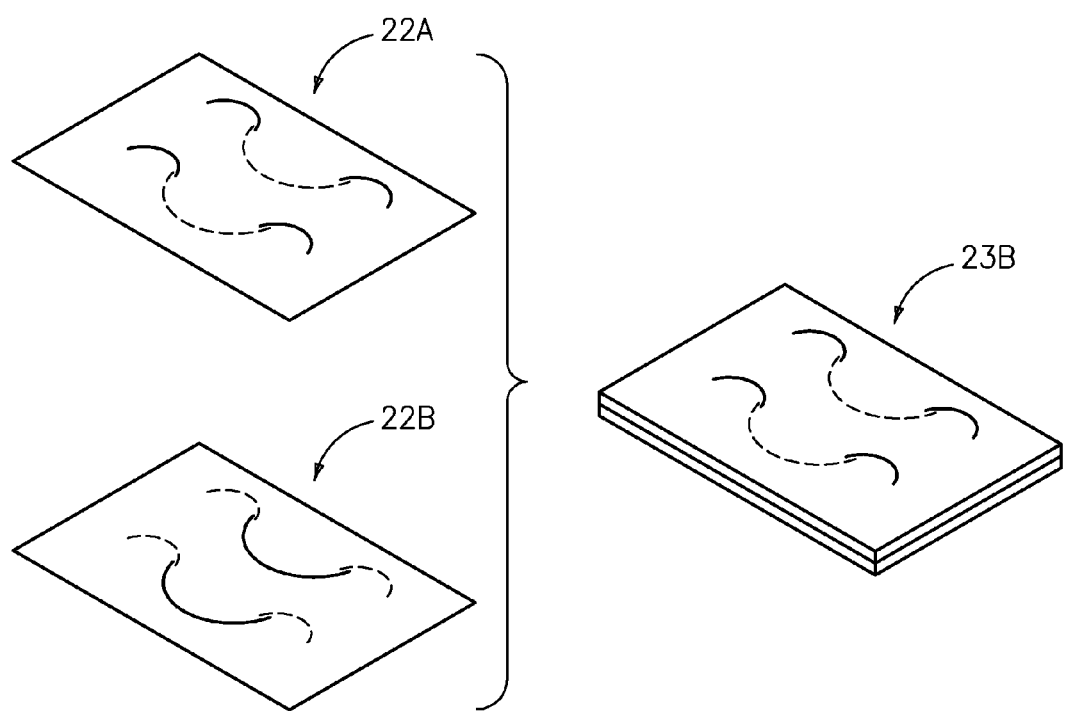
FIG. 3 is another non-limiting embodiment of a pattern of features applied to a pair of separation membranes.

Referring to FIG. 3, each leaf 23B may include a pattern of features 40 applied to both sides of each of the pair of separation membranes 22A, 22B in another non-limiting embodiment. The pattern of features 40 on separation membrane 22A and the pattern of features 40 on the separation membrane 22B may be interleaved or otherwise related to each other when the separation membrane 22A, 22B are bonded together to form a leaf 23B.

Figure 4:
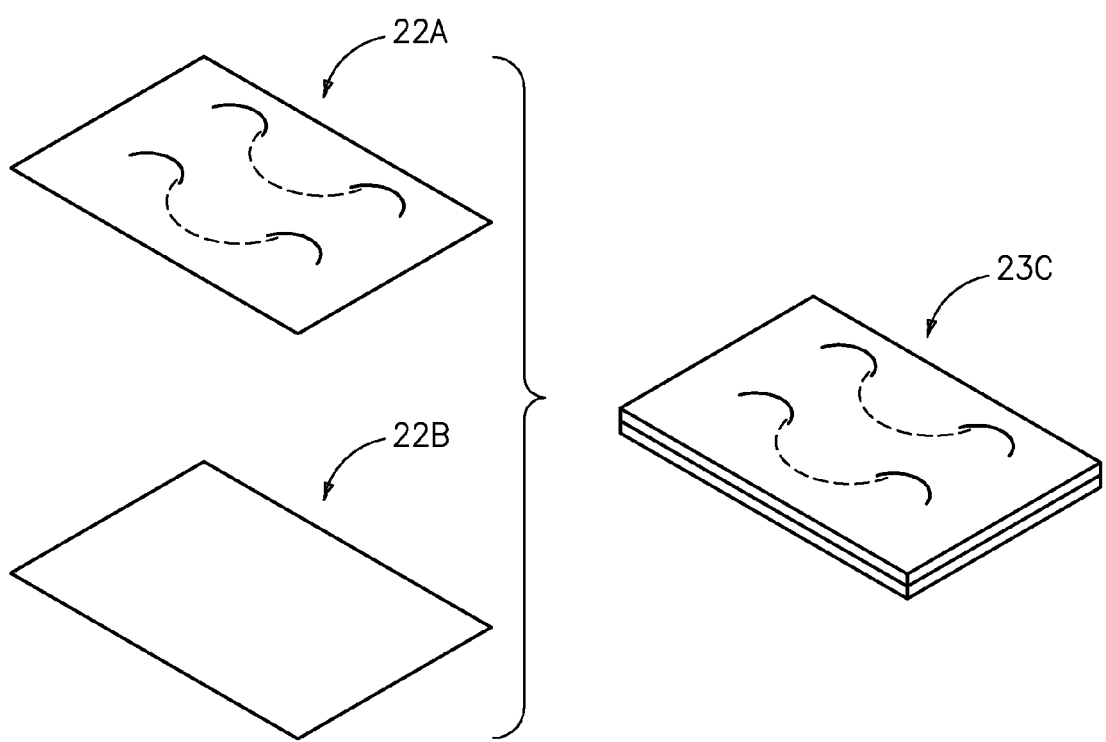
FIG. 4 is another non-limiting embodiment of a pattern of features applied to a pair of separation membranes.

Referring to FIG. 4, each leaf 23C may include a pattern of features 40 applied to both sides of but one separation membrane 22A of the pair of separation membranes 22A, 22B in another non-limiting embodiment. The pattern of features 40 applied to both sides of the single separation membrane 22A in each leaf 23 forms an alternating arrangement with plain separation membranes 22B within the plurality of separation membranes 22.

Figure 5:
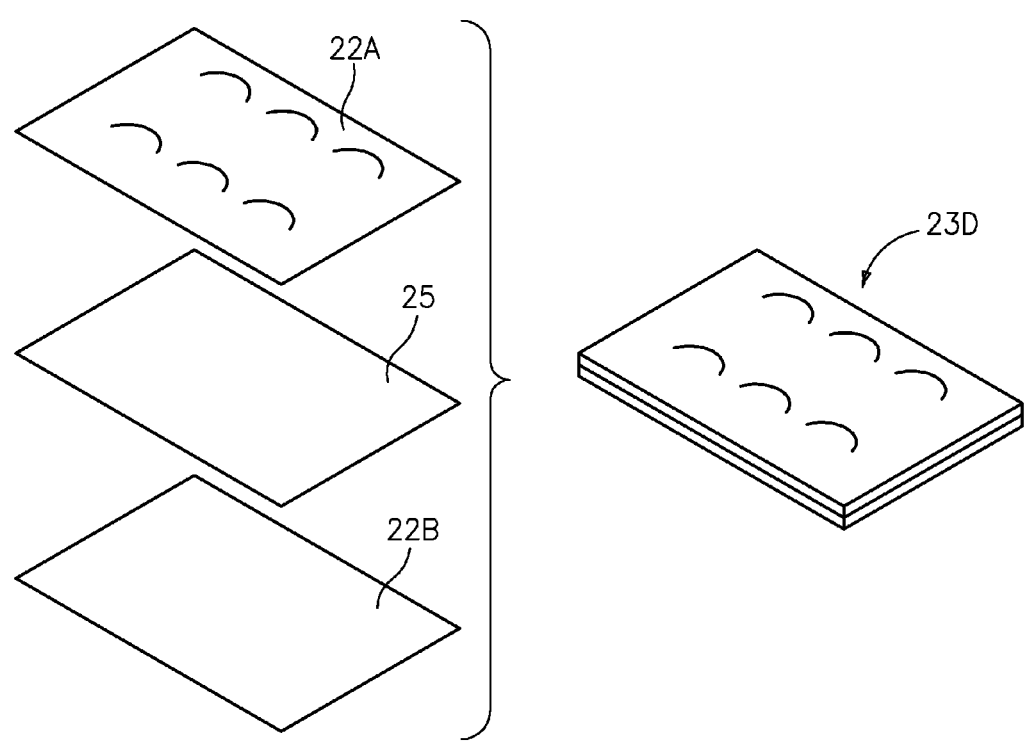
FIG. 5 is another non-limiting embodiment of a pattern of features applied to a pair of separation membranes.

Referring to FIG. 5, each leaf 23D may include a pattern of features 40 applied to one side of one separation membrane 22A of the pair of separation membranes 22A, 22B with a permeate collection material 25 therebetween in another non-limiting embodiment. The pattern of features 40 applied to one side of one separation membrane 22A facilitates spacing between each leaf 23 within the plurality of separation membranes 22.

Figure 6:
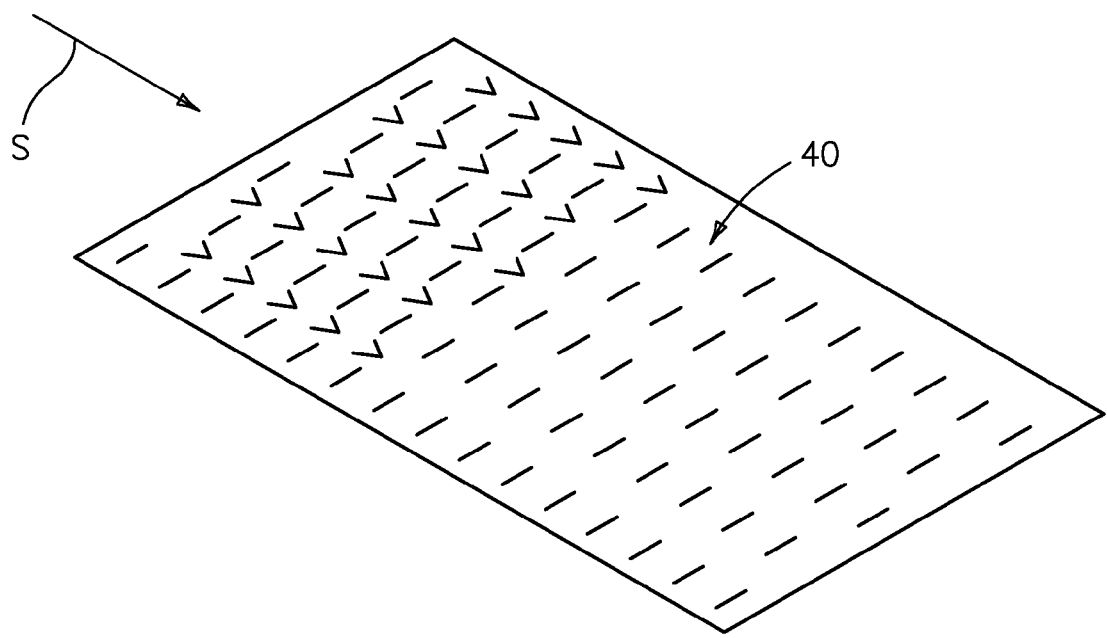
FIG. 6 is another non-limiting embodiment of a pattern of features applied in a graduated pattern.

Referring to FIG. 6, the pattern of features 40 may be of various forms. The pattern features 40 in one non-limiting embodiment include a graduated pattern which increases in density along the axial feed solution S fluid flowpath. It should be understood that various patterns, feature shapes and combinations thereof may alternatively or additionally be utilized.

Figure 7:
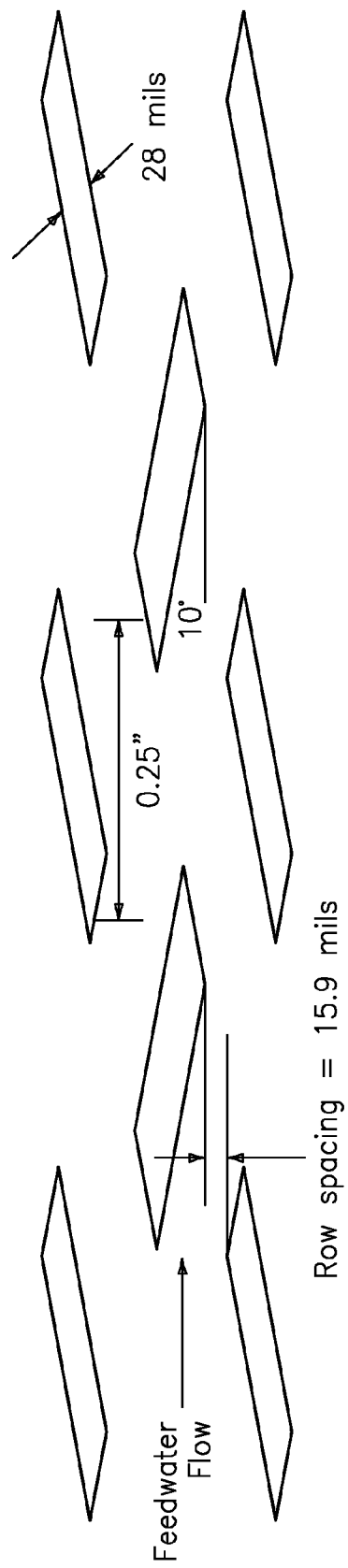
FIG. 7 is another non-limiting embodiment of a pattern of features.
Figure 8:
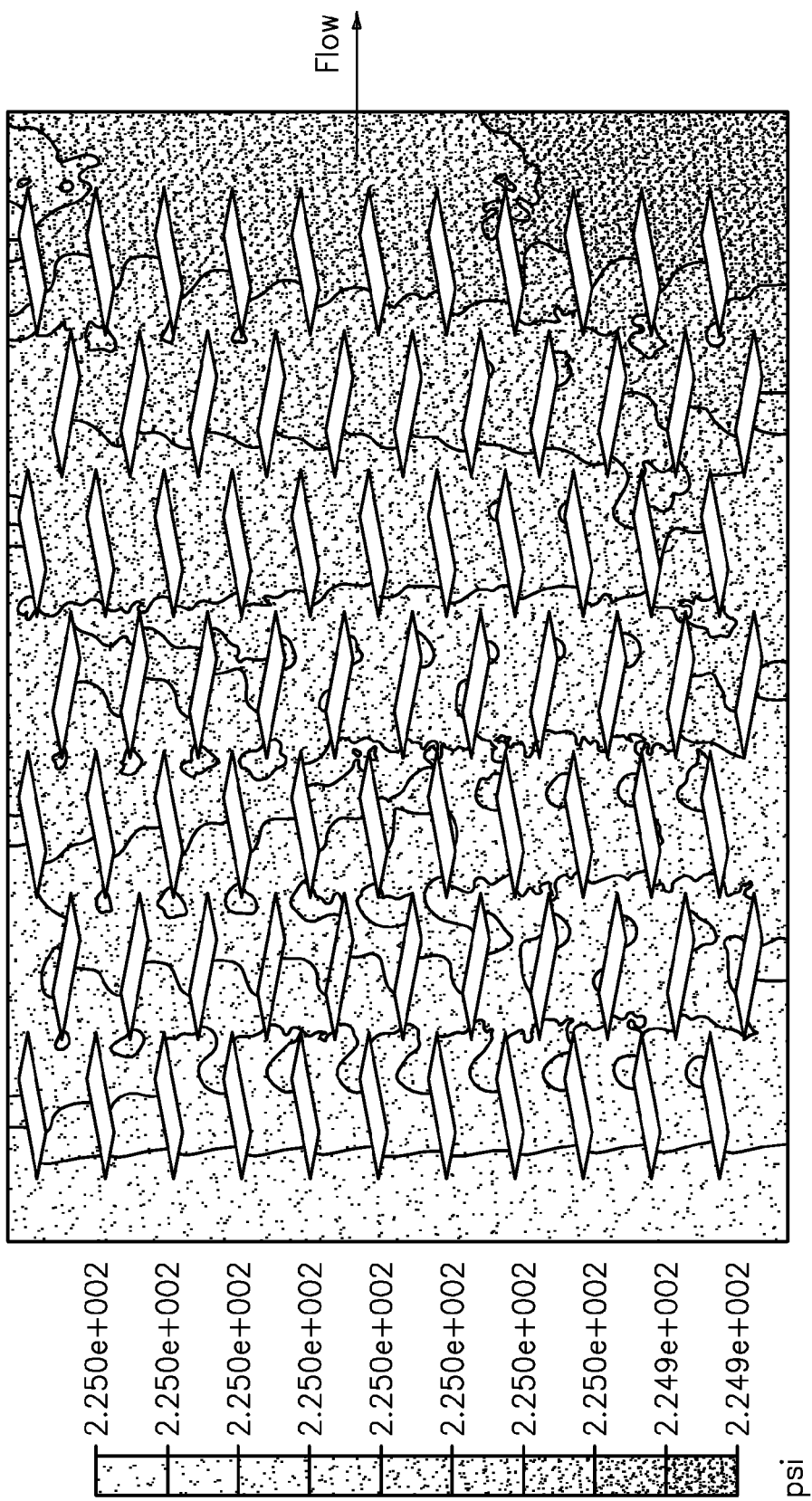
FIGS. 8-14 are flow determinations from the pattern of features of FIG. 7.
Figure 9:
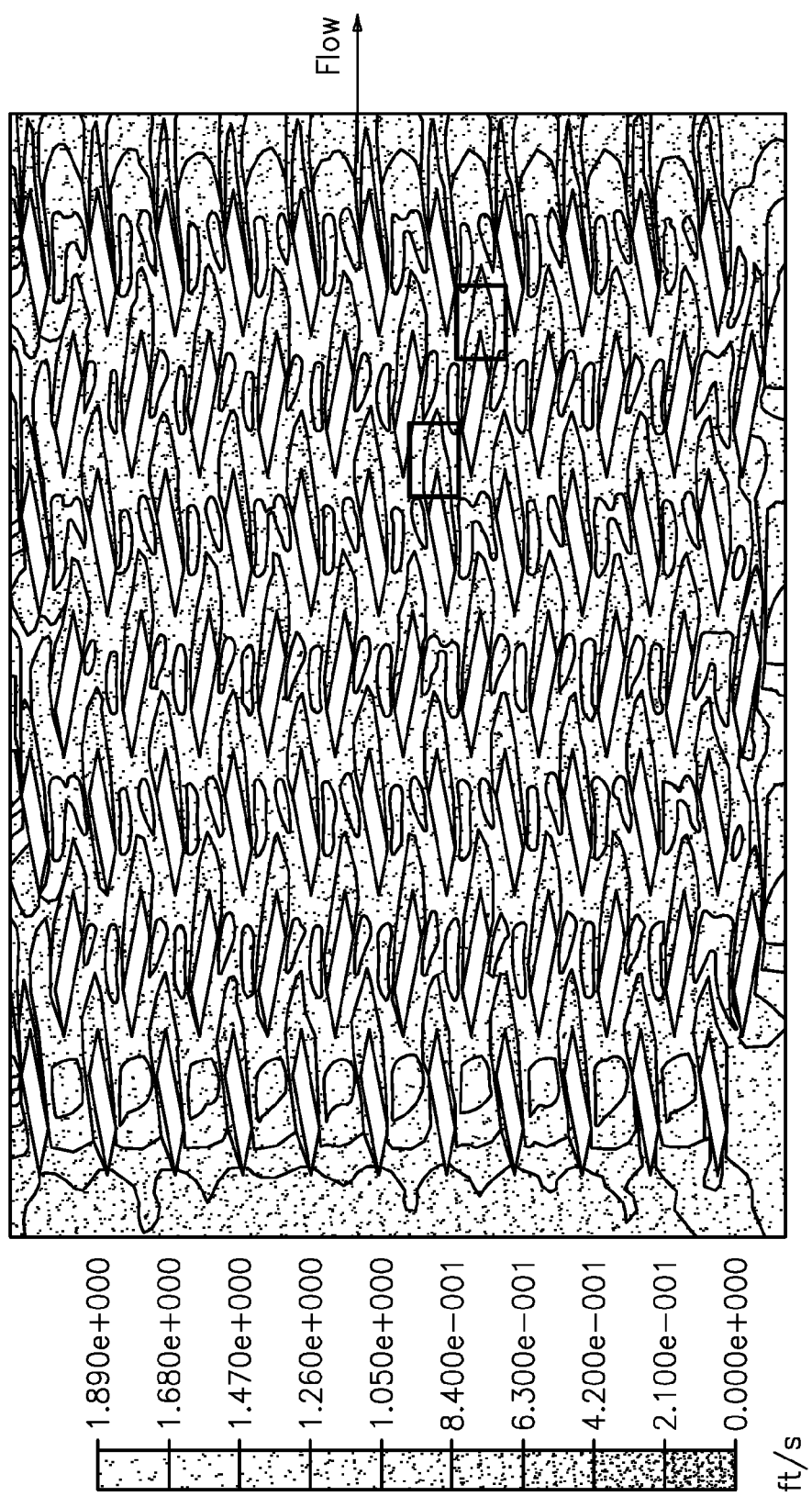
Figure 10:
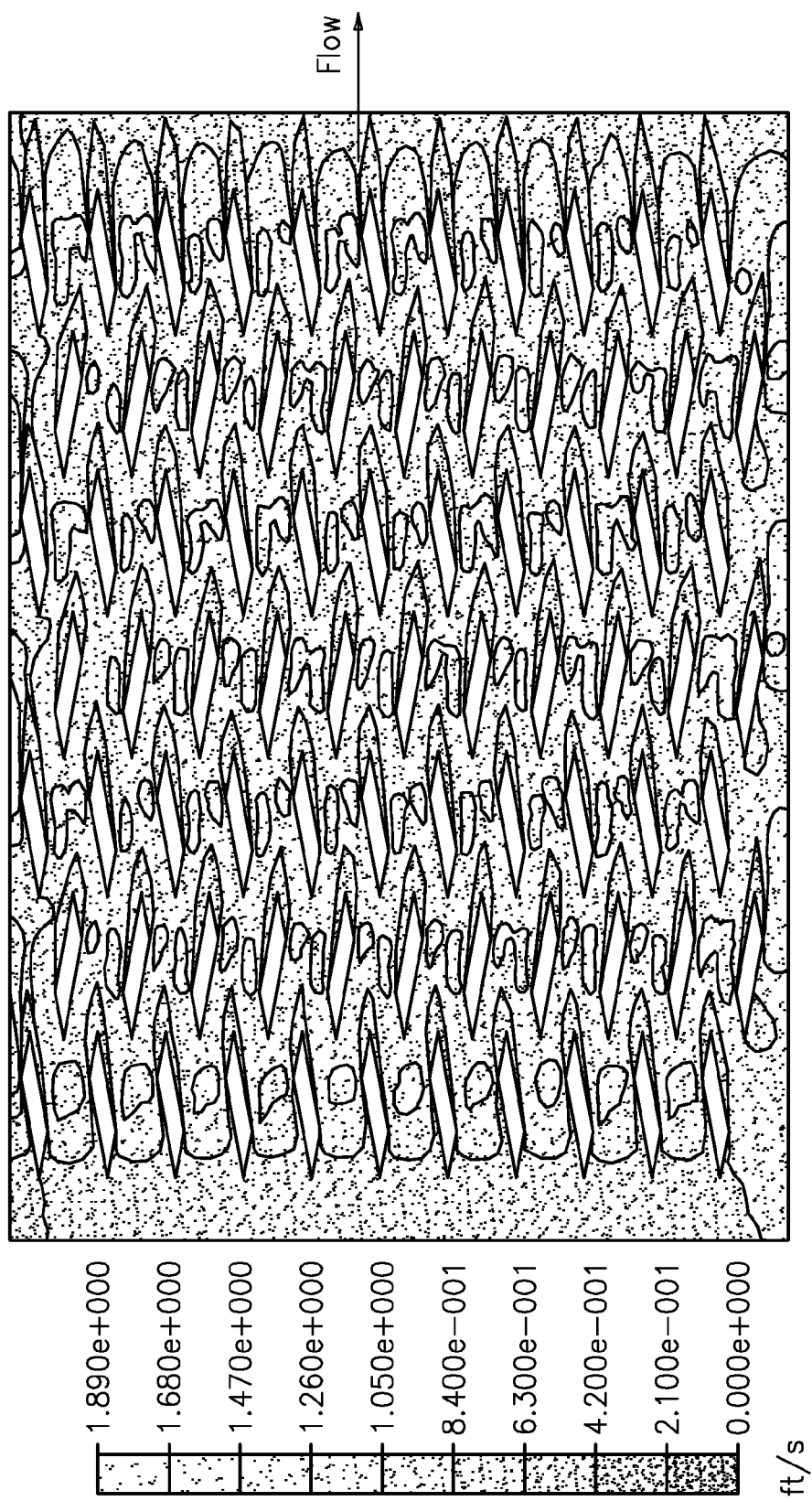
Figure 11:
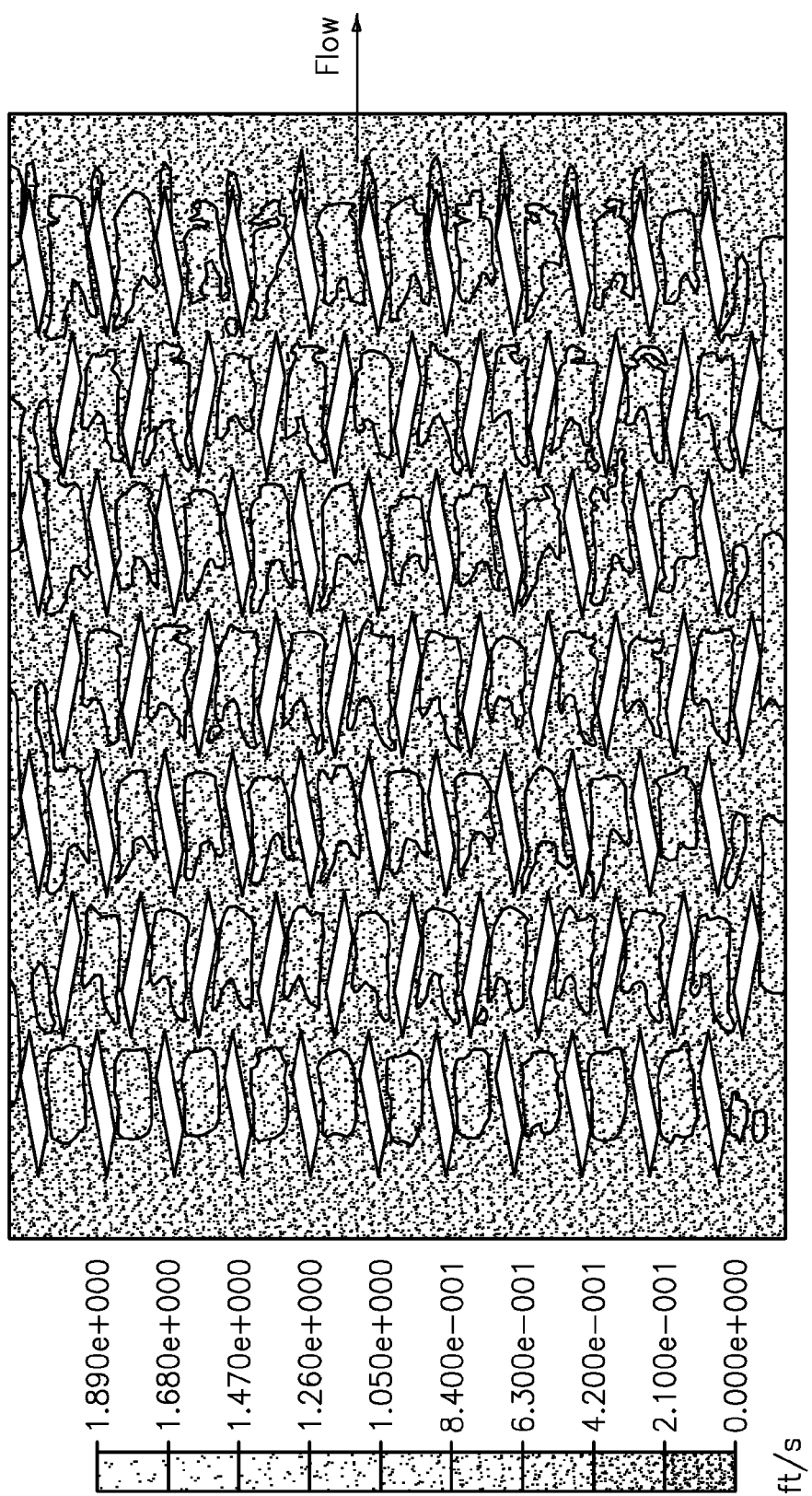
Figure 12:
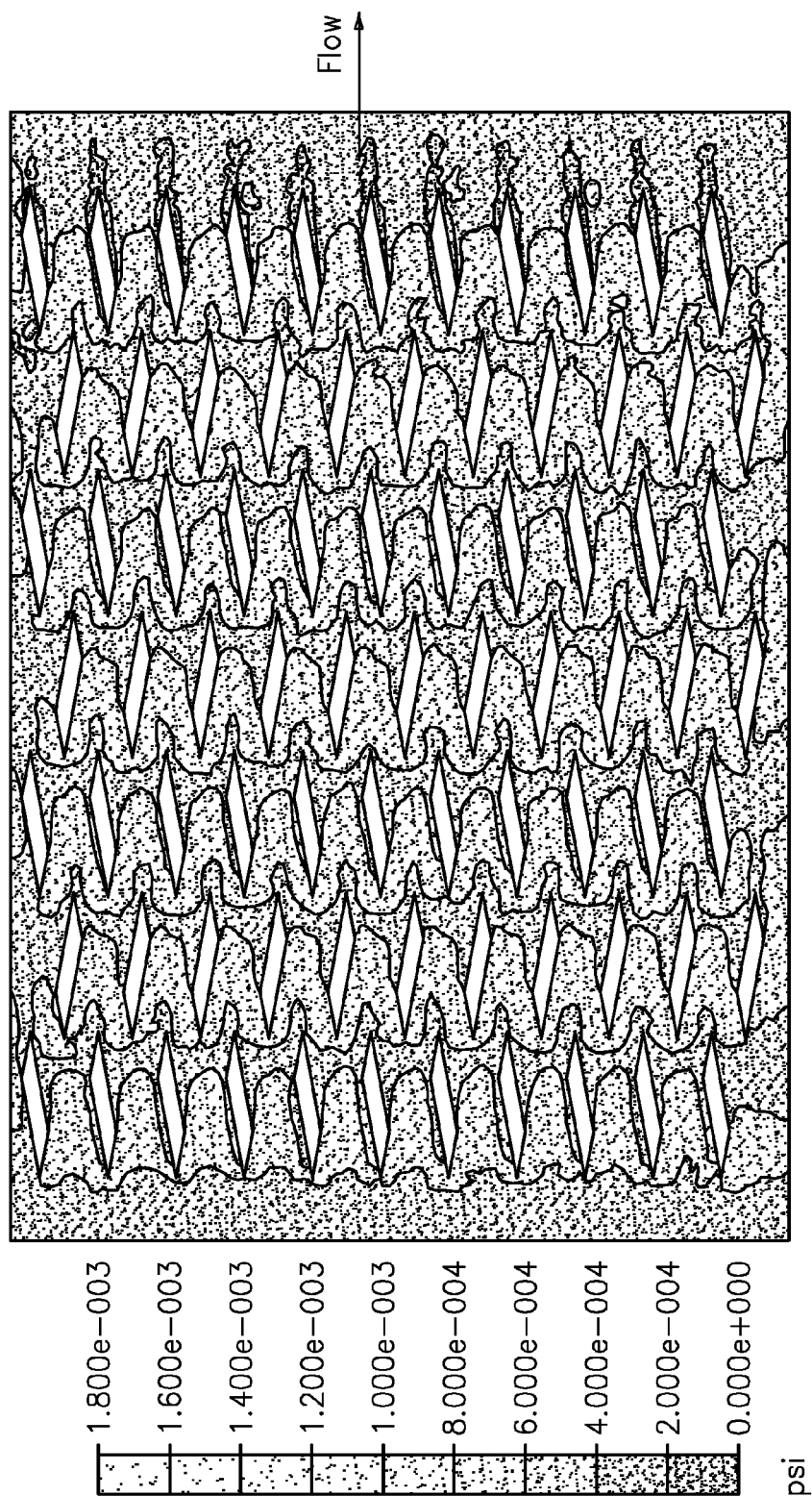
Figure 13:
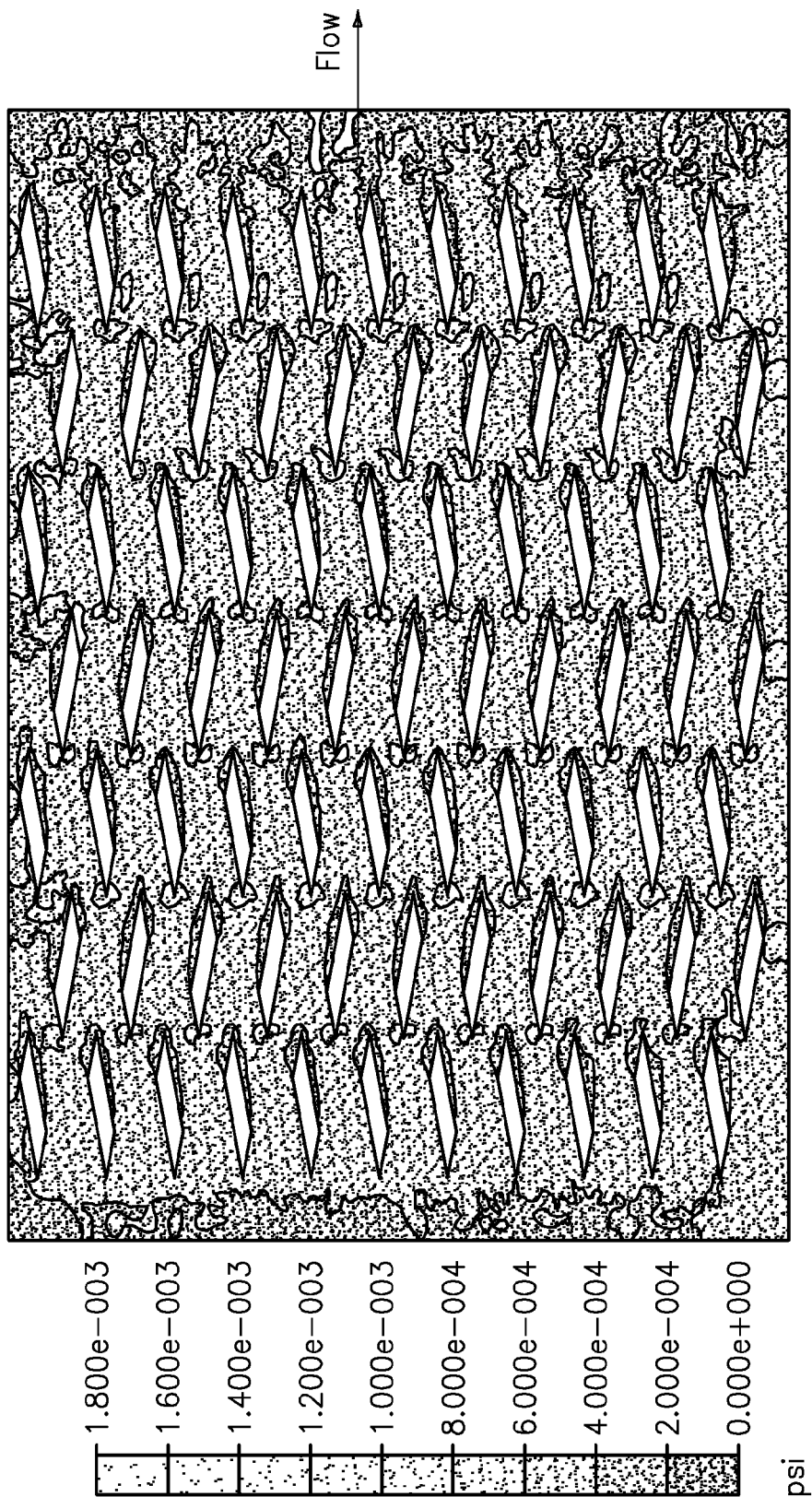
Figure 14:
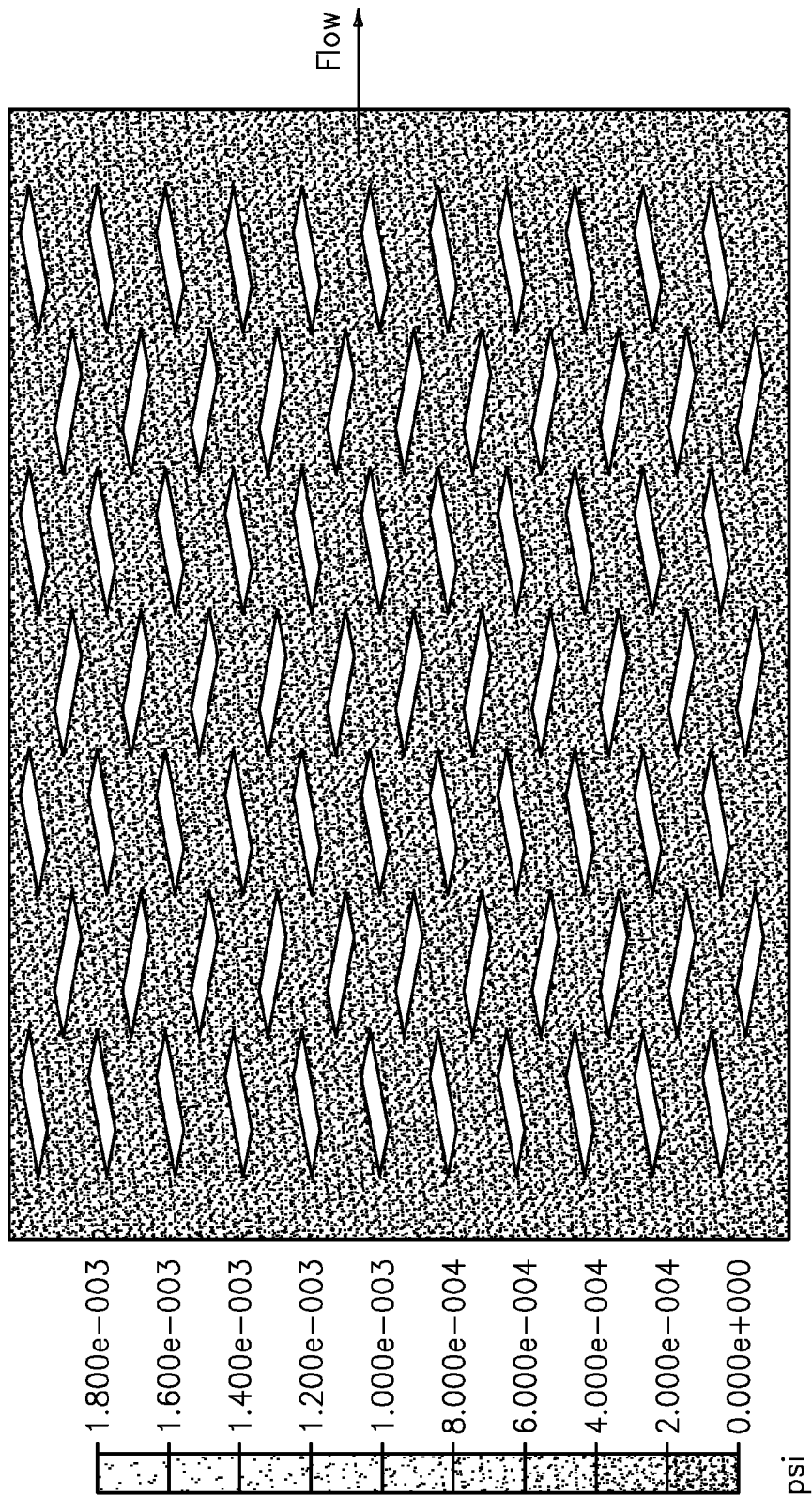

Referring to FIG. 7, a pattern of features 40A according to one-non-limiting embodiment provides straight vanes angled 10° to the feedwater flow direction. Each feature 40A alternate and stagger the vanes in each spacer row. Vane height spans the channel height of 28 mils and row spacing of 15.9 mils (zero before 10° rotation). It should be understood alternative relationships such as straight vanes angled 20° (or less) with row spacing of 28 mils; no row spacing; vane width of 28 mils and axial length to 0.25" and various combinations thereof may alternatively or additionally be utilized.

The pattern of features 40A provide a lower hydraulic resistance to the flow (~77% reduction in axial pressure gradient from 0.13 psi/inch to 0.03 psi/inch); minimize flow angle-of-attack minimizes hydraulic resistance and minimizes low velocity wake regions where biofouling occurs; and provides higher channel midplane velocities and thus higher fluid shearing to resist biofouling buildup and resist membrane clogging (FIGS. 8-14)

Figure 15:
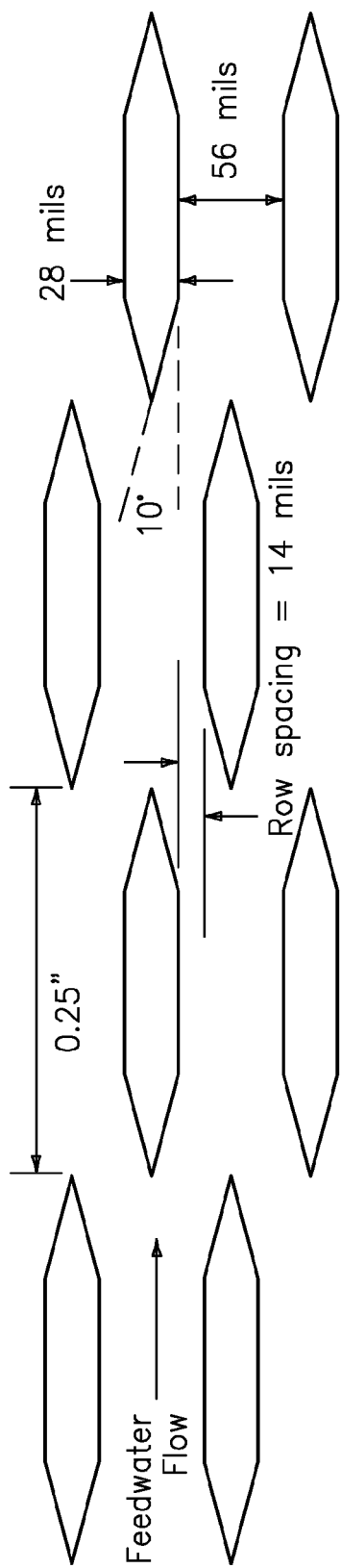
FIG. 15 is another non-limiting embodiment of a pattern of features.
Figure 16:
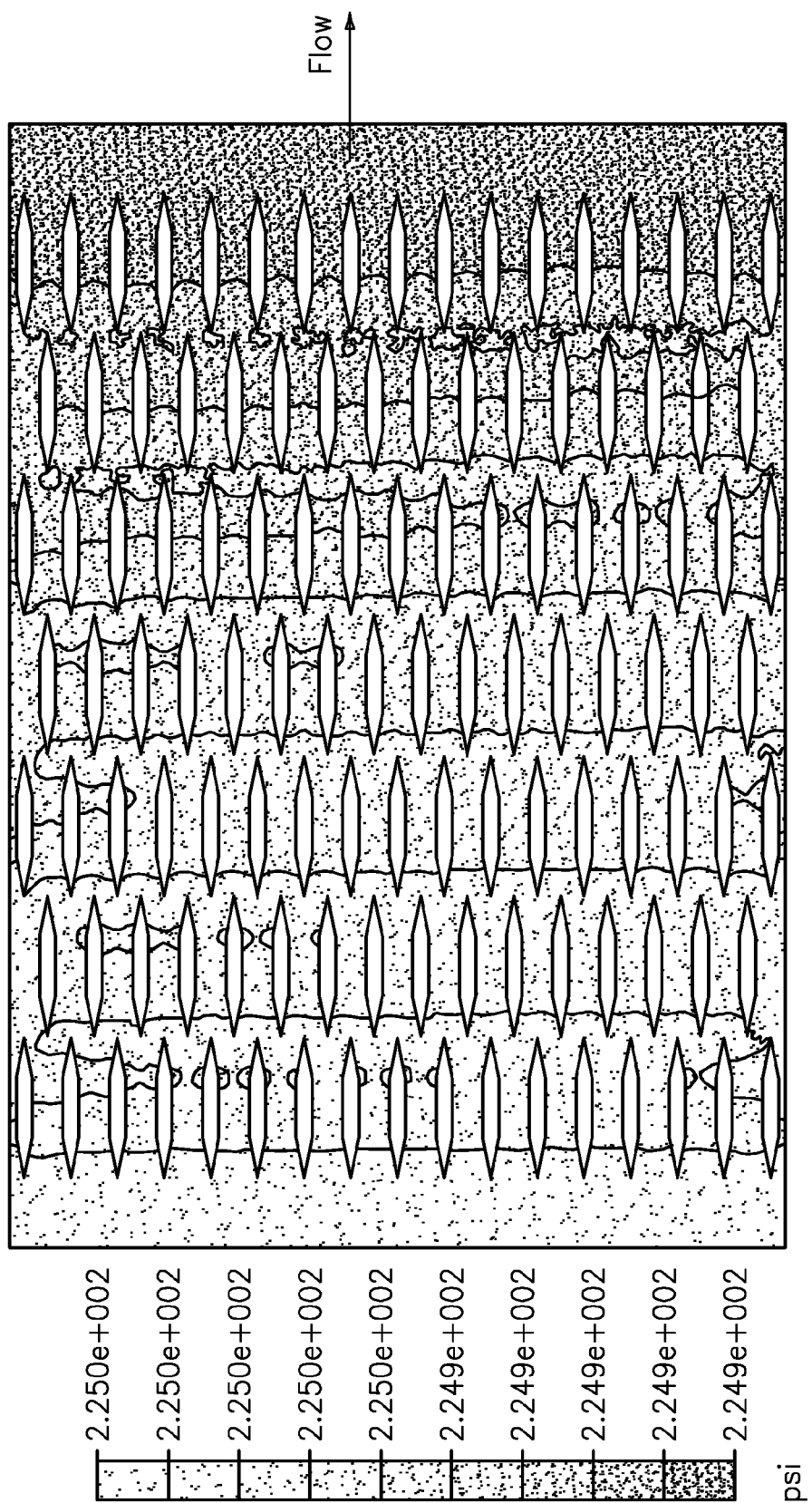
FIGS. 16-22 are flow determinations from the pattern of features of FIG. 15.
Figure 17:
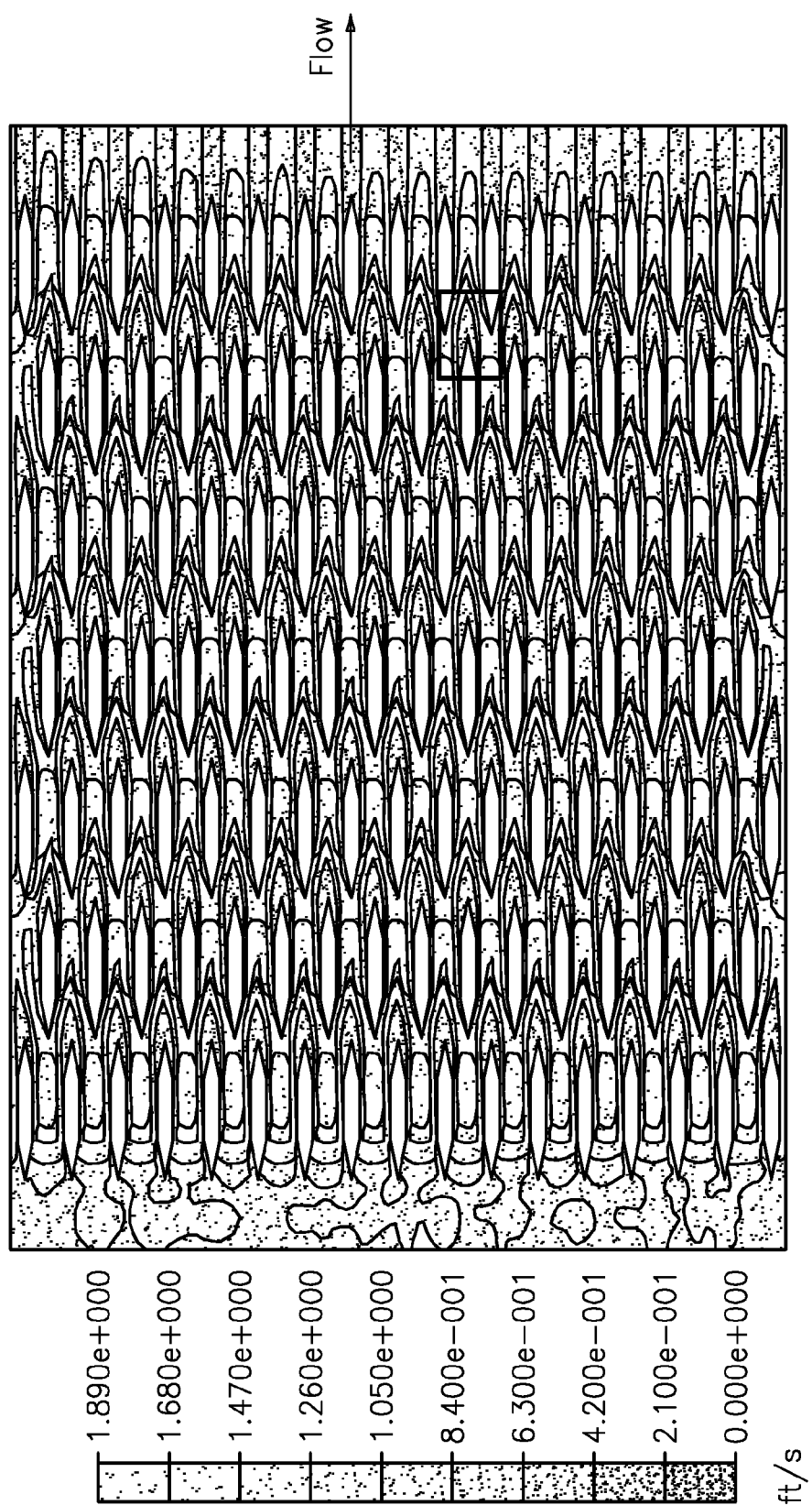
Figure 18:
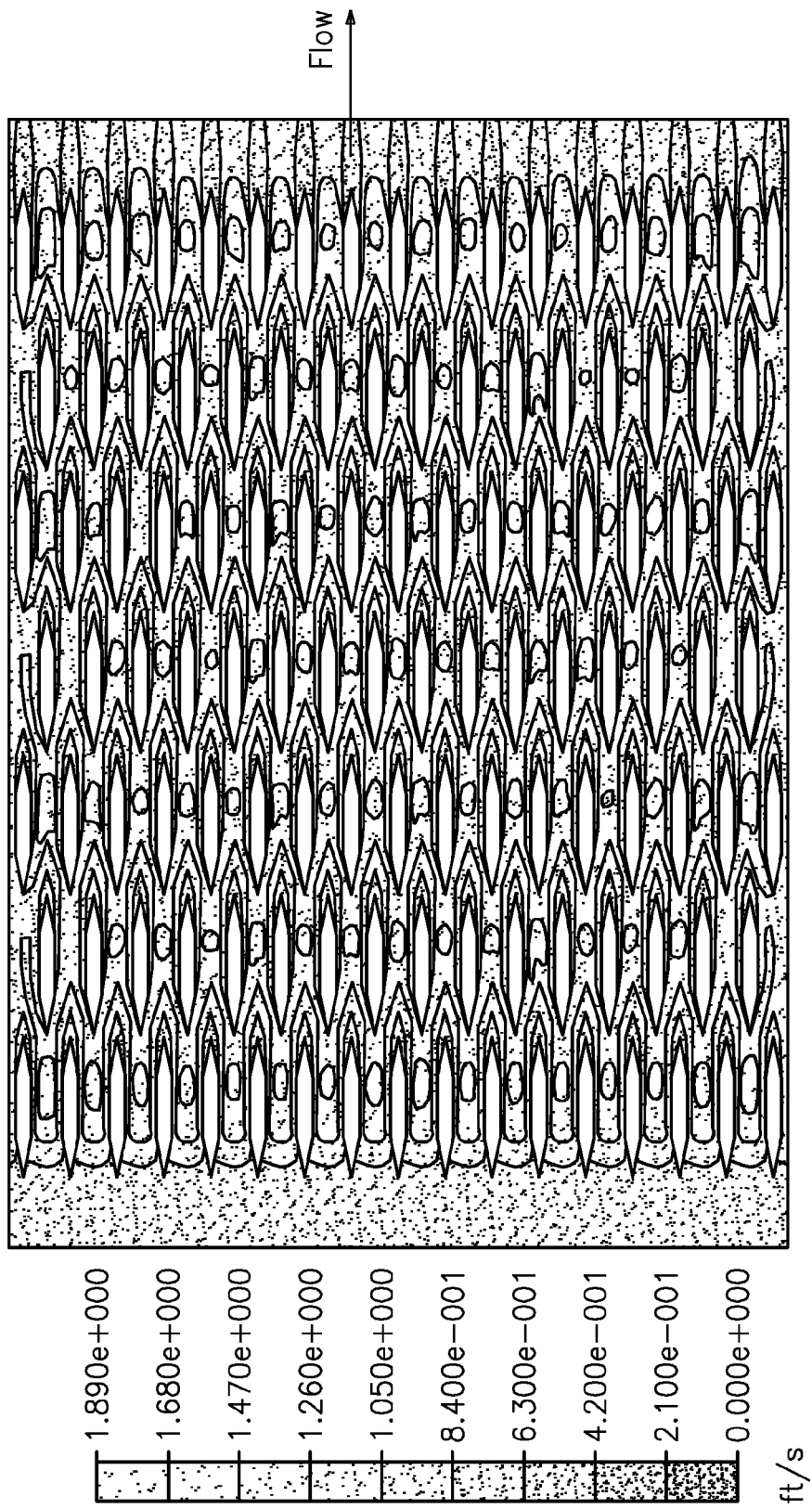
Figure 19:
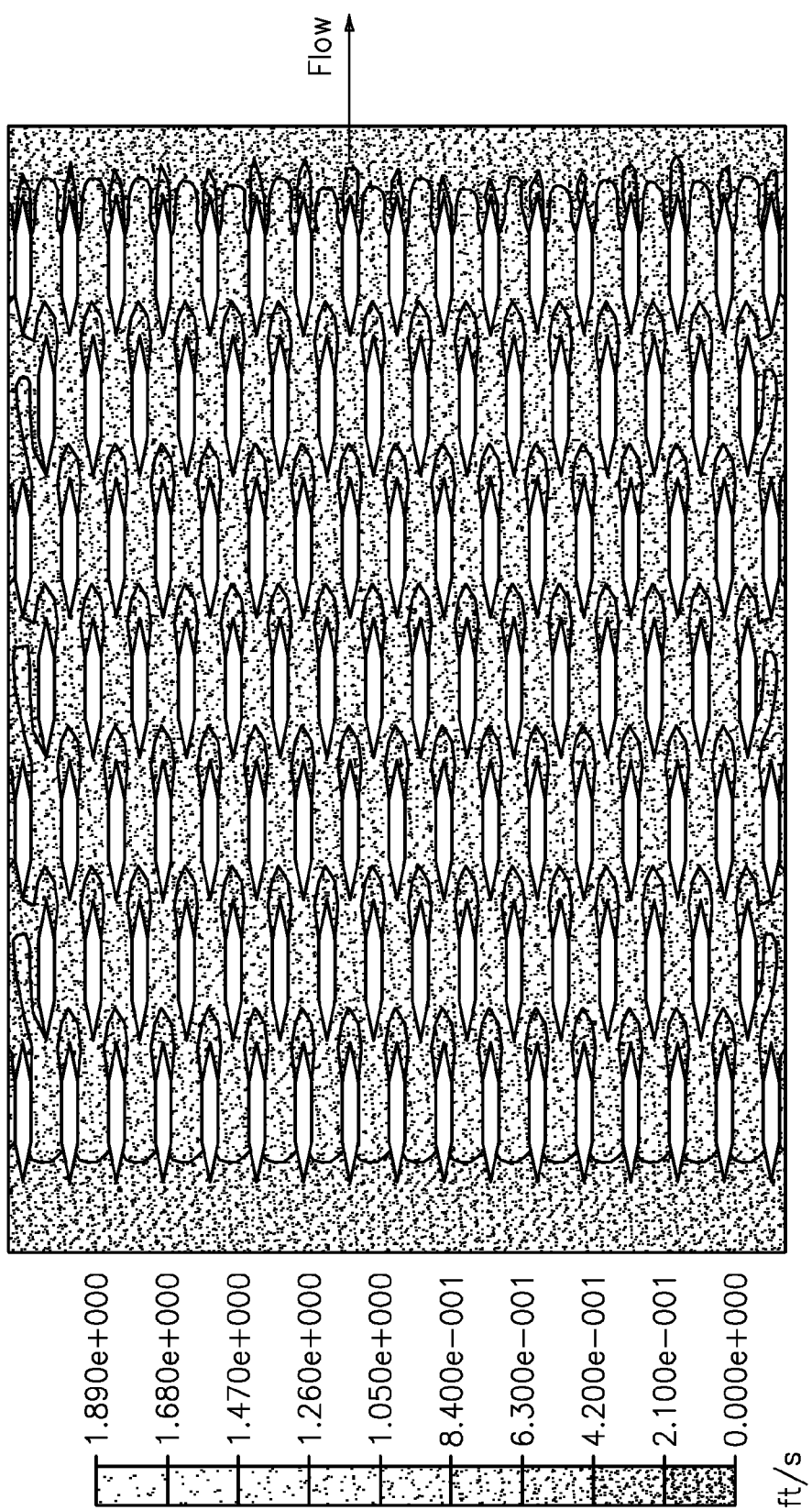
Figure 20:
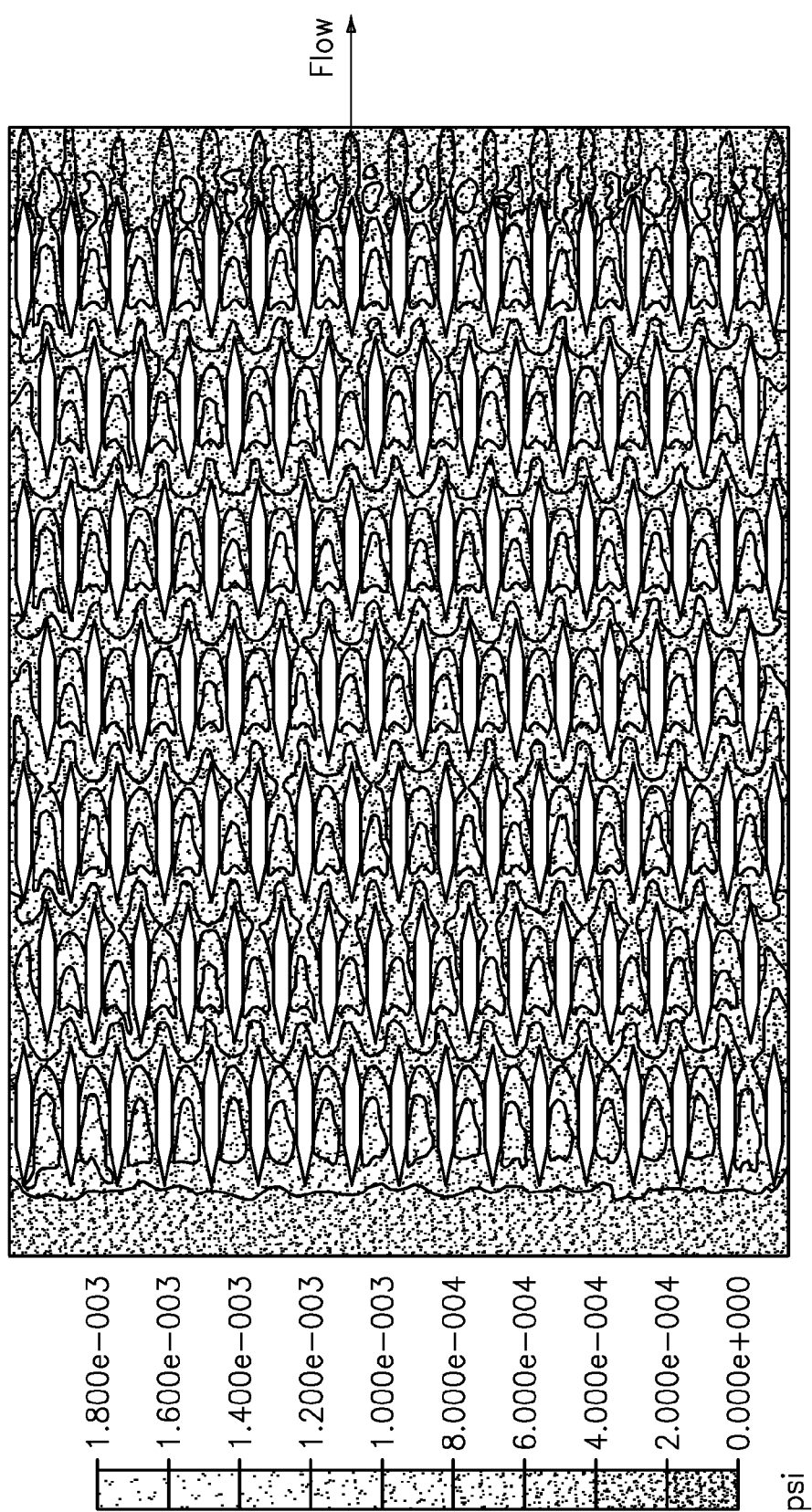
Figure 21:
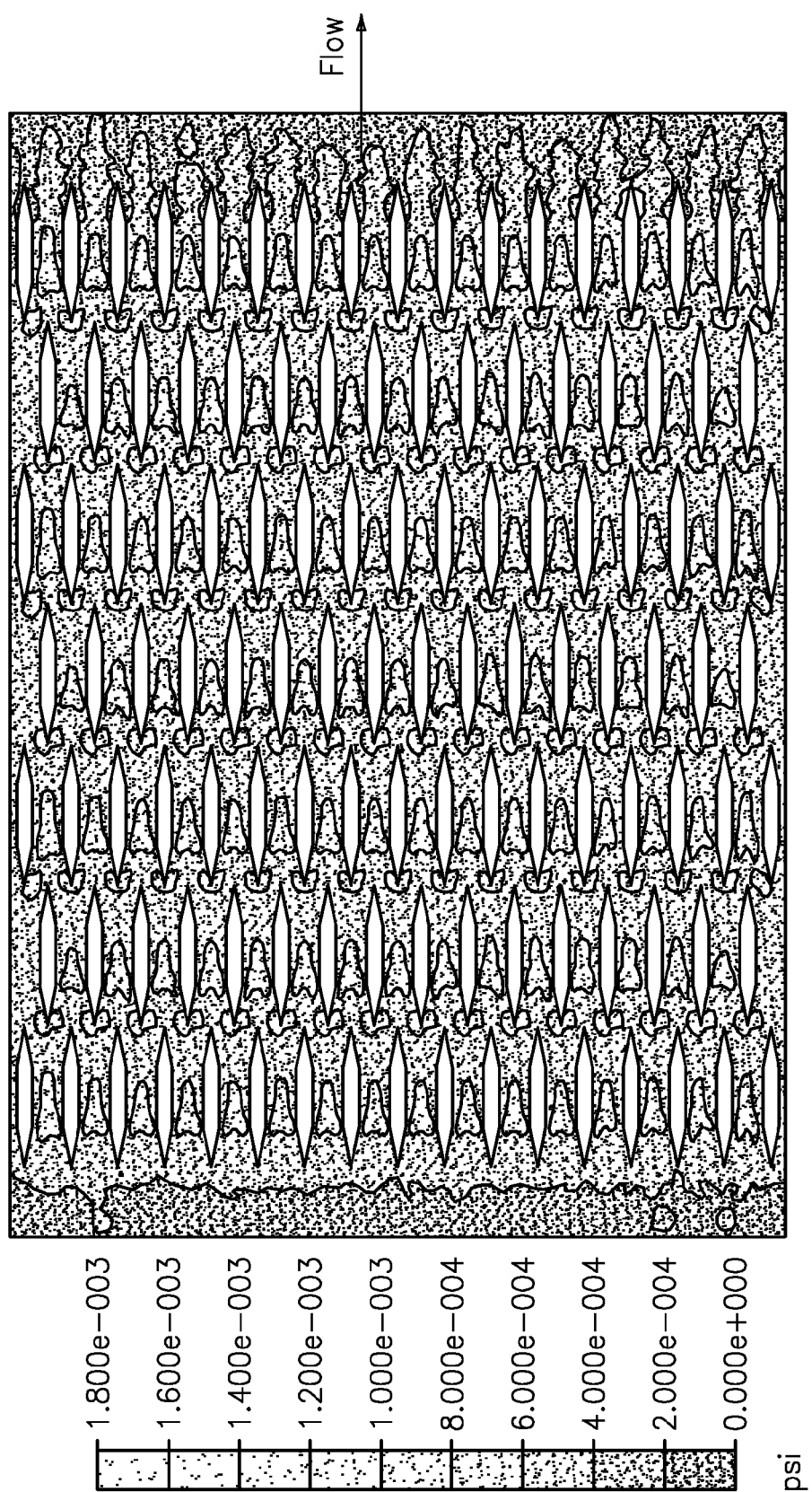
Figure 22:
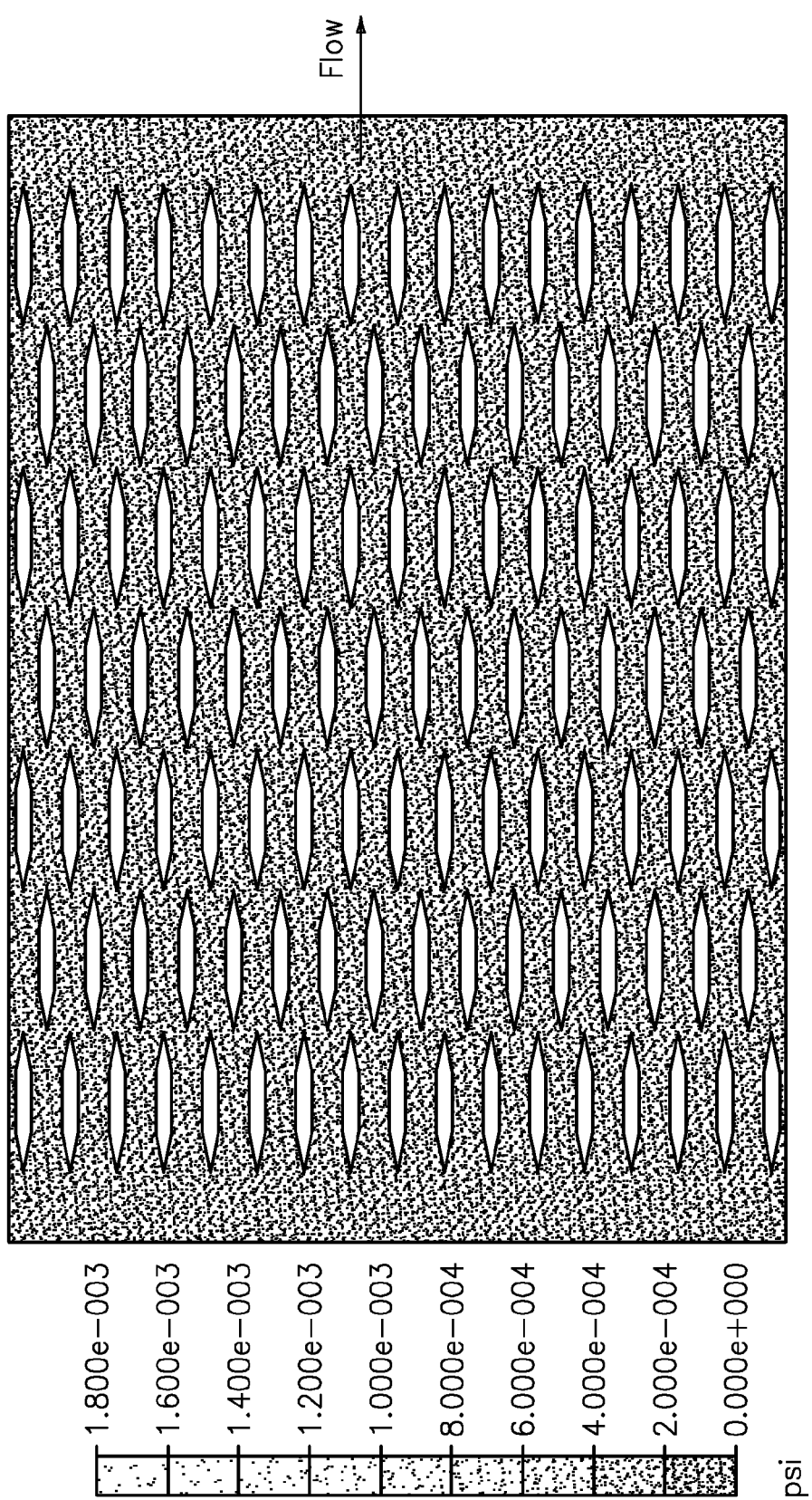

Referring to FIG. 15, a pattern of features 40B according to one-non-limiting embodiment provides stretched diamonds to minimize the max flow angle-of-attack and improve flow separation regions. The stretched diamond vanes include 10° half angle ends, aligned with the feedwater flow direction. Each feature 40B alternate and stagger the vanes in each spacer row. Vane height spans the channel height of 28 mils and row spacing of 14 mils between columns (56 mils for same column).

The pattern of features 40B provide the highest channel midplane velocities and thus highest fluid shearing to resist bacterial biofouling buildup and resist membrane clogging; and lower hydraulic resistance to the flow (~69% reduction in axial pressure gradient from 0.13 psi/inch to 0.04 psi/inch) (FIGS. 16-22).

The pattern of features 40B may be optimized in relationship to provide a tradeoff between axial pressure gradient and channel velocities. The wake regions therefrom can also be further reduced by overlapping the spacer columns by about half the tip length of each adjacent feature 40B. Minimizing low velocity wake regions, where biofouling may be likely is achieved through the column overlap of the feature 40B to reduce the wake regions. Notably, wake regions can be further improved by overlapping the spacer columns by half the tip length. A reduction in the wake regions cause the axial pressure drop to increase in order to pump the same flow rate through the channels. While spacer shape and flow angle-of-attack relative to the incoming flow are important to minimize both pressure drop and wake regions, at some point in optimization further improvements to the wake region to reduce biofouling result in a greater pressure drop. This point essentially provides the optimized relationship.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present application.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A fluid separation system comprising:
a separation membrane having a pattern of features thereon, said pattern of features include
a first multiple of vanes angled relative to a flow direction, each of said first multiple of vanes define a stretched diamond shape,
a second multiple of vanes angles relative to the flow direction, each of said second multiple of vanes define a stretched diamond shape,
the first multiple of vane and the second multiple of vanes are located in an alternating staggered arrangement,
each of said first multiple of vanes at least partially overlap an adjacent each of said second multiple of vanes by about half of a tip length of the stretched diamond shape.

* * * * *